US011497179B2

(12) United States Patent
Lafian

(10) Patent No.: US 11,497,179 B2
(45) Date of Patent: Nov. 15, 2022

(54) LONG-RANGE REMOTE SOLENOID-VALVE ACTUATOR

(71) Applicant: Jesse Lafian, Athens, GA (US)

(72) Inventor: Jesse Lafian, Athens, GA (US)

( * ) Notice: Subject to any disclaimer, the term of this patent is extended or adjusted under 35 U.S.C. 154(b) by 615 days.

(21) Appl. No.: 16/516,217

(22) Filed: Jul. 18, 2019

(65) Prior Publication Data
US 2020/0022322 A1   Jan. 23, 2020

Related U.S. Application Data

(60) Provisional application No. 62/699,972, filed on Jul. 18, 2018.

(51) Int. Cl.
| | |
|---|---|
| *H04L 67/125* | (2022.01) |
| *H04W 4/029* | (2018.01) |
| *H04W 88/16* | (2009.01) |
| *H04W 92/00* | (2009.01) |
| *A01G 25/16* | (2006.01) |
| *G05B 19/042* | (2006.01) |
| *H04L 9/32* | (2006.01) |

(Continued)

(52) U.S. Cl.
CPC ............ *A01G 25/165* (2013.01); *F16K 31/02* (2013.01); *F16K 31/082* (2013.01); *G05B 19/0423* (2013.01); *G05B 19/0426* (2013.01); *G06F 3/0482* (2013.01); *G06V 30/2247* (2022.01); *H04L 9/3226* (2013.01); *H04L 67/125* (2013.01); *H04W 4/029* (2018.02); *H04W 88/16* (2013.01); *H04W 92/00* (2013.01); *G05B 2219/23051* (2013.01); *G05B 2219/2625* (2013.01); *H04W 4/027* (2013.01)

(58) Field of Classification Search
CPC . G06F 3/0482; G06V 30/2247; H04L 9/3226; H04L 67/125; H04W 92/00; H04W 4/027; H04W 4/02; H04W 4/00; G05B 2219/23051; G05B 2219/2625; G05B 19/042
See application file for complete search history.

(56) References Cited

U.S. PATENT DOCUMENTS

| | | | |
|---|---|---|---|
| 5,577,863 A * | 11/1996 | Nottle | E02B 7/205 405/101 |
| 2005/0107924 A1* | 5/2005 | Bailey | A01G 25/167 700/284 |

(Continued)

FOREIGN PATENT DOCUMENTS

CN         104904570 A  *  9/2015

OTHER PUBLICATIONS

Sales et al., "Wireless Sensor and Actuator System for Smart Irrigation on the Cloud," IEEE. (Year: 2015).*

(Continued)

*Primary Examiner* — Alina A Boutah
(74) *Attorney, Agent, or Firm* — White-Welker & Welker, LLC; Matthew T. Welker, Esq.

(57) ABSTRACT

The present invention teaches a solenoid-valve actuator that is battery-powered and communicates remotely and wirelessly (e.g., via LoRaWAN) to a gateway that communicates with the internet, thereby enabling a user to remotely control fluid flow through a solenoid valve. The end device interfaces to a range of latching solenoid operated valves, e.g., for the control of water flow in irrigation systems.

11 Claims, 9 Drawing Sheets

(51) Int. Cl.
    *G06F 3/0482*      (2013.01)
    *F16K 31/08*      (2006.01)
    *F16K 31/02*      (2006.01)
    *G06V 30/224*      (2022.01)
    *H04W 4/02*      (2018.01)

(56) References Cited

U.S. PATENT DOCUMENTS

| | | | | |
|---|---|---|---|---|
| 2007/0179674 A1* | 8/2007 | Ensworth | ............ | H04W 88/00 700/284 |
| 2008/0087254 A1* | 4/2008 | Tanaka | ............ | F16K 31/0675 123/472 |
| 2009/0196218 A1* | 8/2009 | Pulini | ............ | H04L 67/2842 370/328 |
| 2010/0052193 A1* | 3/2010 | Sylvester | ............ | A01K 63/042 261/26 |
| 2013/0173070 A1* | 7/2013 | Tennyson | ............ | G05B 19/02 700/284 |
| 2016/0153579 A1* | 6/2016 | Radomsky | ............ | F16K 37/0083 251/30.01 |
| 2019/0049930 A1* | 2/2019 | Rossano | ............ | F16K 37/0041 |
| 2019/0069241 A1* | 2/2019 | Gilson | ............ | H04W 52/0241 |
| 2019/0170170 A1* | 6/2019 | Yuan | ............ | H02K 7/1823 |
| 2019/0234786 A1* | 8/2019 | Klicpera | ............ | G01M 3/26 |
| 2019/0281371 A1* | 9/2019 | Klicpera | ............ | H04Q 9/00 |

OTHER PUBLICATIONS

"Extreme Range Wireless Smart-Valve," www.stregatechnologies.com. (Year: 2022).*
Zhao et al., "Design and Implementation of Smart Irrigation System Based on LoRa," IEEE. (Year: 2017).*
Li et al., "Design of rice intelligent water-saving irrigation system based on agricultural internet of things," IOP Conf. Series: Journal of Physics: Conf. Series 1176 (2019) 052068, Mar. 2019. (Year: 2019).*
Netafim, "Battery Operated Control Valves." (Year: 2022).*

* cited by examiner

LONG-RANGE REMOTE SOLENOID-VALVE ACTUATOR

CROSS REFERENCE TO RELATED APPLICATIONS

This application claims the benefit of U.S. provisional patent application No. 62/699,972, entitled "Remote Enabled Solenoid-Valve Actuator", filed Jul. 18, 2018. The provisional application is incorporated herein by reference in its entirety.

FEDERALLY SPONSORED RESEARCH

Not Applicable

SEQUENCE LISTING OR PROGRAM

Not Applicable

TECHNICAL FIELD OF THE INVENTION

The present invention relates to irrigation systems and, more specifically, to long-range remote control of one or more desired areas within irrigation systems.

BACKGROUND OF THE INVENTION

An irrigation system is an apparatus that enables the application of controlled amounts of water to plants at needed intervals. Common locations where irrigation systems are used are campuses and shopping centers, where an irrigation system is typically automated and comprises three main parts—a controller, solenoid valves, and sprinklers.

A controller is the brain of an irrigation system that opens the solenoid valves, thereby allowing water to flow through the solenoid valves to the sprinklers and ultimately to the plants needing irrigation. A conventional controller sends a 24 VAC signal to a solenoid valve via copper wire that is buried underground and often spans hundreds of feet. Thus, due to the presence of dozens of valves on a typical site there may be thousands of feet of buried wire for controlling irrigation. (Note: an AC solenoid valve remains closed unless it receives a continuous 24 VAC signal from the controller.)

This configuration often causes problems because irrigation wires get cut after installation (e.g., cut by another landscaper digging on site to install plants), rendering parts of the irrigation system inoperable. Another disadvantage is that lightning can significantly damage such a system, as it is interconnected by conductive wires.

The state-of-the-art solution for dealing with these problems is to avoid installing a centralized controller. Instead, a battery-operated controller, such as Rain Bird TBOS-BT device, is connected to each valve. A TBOS-BT device can control 1, 2, 4, or 6 valves at a time, depending on the model. While this method avoids burying long spans of wire underground, it has a disadvantage—in order for a user to change the irrigation schedule on a TBOS-BT device, as is typically required several times a year based on fluctuating seasonal rainfall and temperature, the user must travel to the job site and walk within range of a TBOS-BT device (i.e., within several hundred feet maximum) to interface with it via a Bluetooth-enabled smartphone app. Thus, a TBOS-BT schedule cannot be updated or changed from a long-range remote distance (e.g., any distance greater than several hundred feet maximum).

Further, TBOS-BT devices cannot be shut off from a long-range remote distance if it starts to rain on a site. This causes water to be wasted and plants to be overwatered, potentially negatively impacting the plants and the curb appeal of the landscape site. Thus, a need remains for an irrigation control system including one or more long-range remote solenoid-valve actuators that enables a user to control irrigation on a site remotely—from anywhere that is connected to the Internet—while avoiding utilizing thousands of feet of wire buried underground.

DEFINITIONS

Long-Range Remote Solenoid-Valve Actuator or "End Device"—a battery-powered apparatus that includes an antenna and an embedded low-power wireless communication device. An end device, when interconnected with other apparatuses of the present invention, enables long-range remote actuation of a wire-connected solenoid valve.

Gateway—a device, including an antenna, that enables two-way remote communication between one or more end devices and a network server. A gateway is a piece of networking hardware used for telecommunications networks that allows data to flow from one discrete network to another. Gateways are distinct from routers or switches in that they communicate using more than one protocol. Concerning the present invention, a gateway located centrally on a site communicates to one or more remote end devices; the gateway also communicates to the Internet via Cellular, Ethernet, or WiFi technology.

Network Server—servers that route messages from gateways to a RESTful API backend, and back.

API—in computer programming, an application programming interface (API) is a set of routines, protocols, and tools for building software applications. An API expresses a software component in terms of its operations, inputs, outputs, and underlying types. An API defines functionalities that are independent of their respective implementations, which allows definitions and implementations to vary without compromising each other.

A RESTful API is an application program interface (API) that uses HTTP requests to GET, PUT, POST and DELETE data. A RESTful API is based on representational state transfer (REST) technology, an architectural style and approach to communications often used in web services development. REST technology is generally preferred to the more robust Simple Object Access Protocol (SOAP) technology because REST leverages less bandwidth, making it more suitable for internet usage.

Application Software or "App"—a set of one or more programs designed to carry out operations for a specific application. Application software cannot run on itself but is dependent on system software to execute. Examples of application software include MS Word, MS Excel, a console game, a library management system, a spreadsheet system etc. The term is used to distinguish such software from another type of computer program referred to as system software, which manages and integrates a computer's capabilities but does not directly perform tasks that benefit the user. The system software serves the application, which in turn serves the user.

The term "app" is a shortening of the term "application software". It has become very popular and in 2010 was listed as "Word of the Year" by the American Dialect Society. Apps are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

BLUETOOTH—a wireless technology standard for exchanging data over short distances (using short-wavelength UHF radio waves in the ISM band from 2.4 to 2.485 GHz) from fixed and mobile devices and building personal area networks (PANs).

Client—a piece of computer hardware or software that accesses a service made available by a server. The server is often (but not always) on another computer system, in which case the client accesses the service by way of a network. The term applies to programs or devices that are part of a client-server model.

Electronic Mobile Device—any computer, phone, smartphone, tablet, or computing device that is comprised of a battery, display, circuit board, and processor that is capable of processing or executing software. Examples of electronic mobile devices are smartphones, laptop computers, and table PCs.

Firmware—a software program or set of instructions programmed on a hardware device. It provides the necessary instructions for how the device communicates with the other computer hardware.

Global Positioning System (GPS)—a space-based navigation system that provides location and time information in all weather conditions, anywhere on or near the earth where there is an unobstructed line of sight to four or more GPS satellites. The system provides critical capabilities to military, civil, and commercial users around the world. The United States government created the system, maintains it, and makes it freely accessible to anyone with a GPS receiver.

Graphical User Interface (GUI)—a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces (CLIs), which require commands to be typed on the keyboard.

Hypertext Transfer Protocol (HTTP)—an application protocol for distributed, collaborative, hypermedia information systems. HTTP is the foundation of data communication for the World Wide Web. Hypertext is structured text that uses logical links (hyperlinks) between nodes containing text. HTTP is the protocol to exchange or transfer hypertext.

The Internet of Things (IoT)—a system of interrelated computing devices, mechanical and digital machines, objects, animals or people that are provided with unique identifiers (UIDs) and the ability to transfer data over a network without requiring human-to-human or human-to-computer interaction.

The Internet Protocol (IP)—the principal communications protocol in the Internet protocol suite for relaying datagrams across network boundaries. Its routing function enables internetworking, and essentially establishes the Internet.

Internet Protocol address (IP address)—a numerical label assigned to each device (e.g., computer, printer) participating in a computer network that uses the Internet Protocol for communication. An IP address serves two principal functions: host or network interface identification and location addressing.

Internet service provider (ISP)—an organization that provides services for accessing, using, or participating in the Internet.

iOS (originally iPhone OS)—a mobile operating system created and developed by Apple Inc. and distributed exclusively for Apple hardware. It is the operating system that presently powers many of the company's mobile devices, including the iPhone, iPad, and iPod touch.

LoRaWAN—a Low Power, Wide Area (LPWA) networking protocol designed to wirelessly connect battery operated 'things' to the internet in regional, national or global networks, and targets key Internet of Things (IoT) requirements such as bi-directional communication, end-to-end security, mobility and localization services.

The LoRaWAN specification defines three device types. All LoRaWAN devices must implement Class A, whereas Class B and Class C are extensions to the specification of Class A devices.

Class A devices support bi-directional communication between a device and a gateway. Uplink messages (from the end device to the server) can be sent at any time (randomly). The end device then opens two receive windows at specified times after an uplink transmission. If the server does not respond in either of these receive windows, the next opportunity will be after the next uplink transmission from the end device. The server can respond either in the first receive window, or in the second receive window, but should not use both windows.

Class B devices extend Class A by adding scheduled receive windows for downlink messages from the server. Using time-synchronized beacons transmitted by the gateway, the end devices periodically open receive windows.

Class C devices extend Class A by keeping the receive windows open unless they are transmitting. This allows for low-latency communication but is many times more energy consuming than Class A devices.

Mobile App—a computer program designed to run on smartphones, tablet computers and other mobile devices, which the Applicant/Inventor refers to generically as "a computing device", which is not intended to be all inclusive of all computers and mobile devices that are capable of executing software applications.

Mobile Device"— a generic term used to refer to a variety of devices that allow people to access data and information from wherever they are. This includes cell phones and other portable devices such as, but not limited to, PDAs, Pads, smartphones, and laptop computers.

Operating System (OS)—software that manages computer hardware and software resources and provides common services for computer programs. The operating system is an essential component of the system software in a computer system. Application programs usually require an operating system to function.

Push Notification, Push, or server push—a style of Internet-based communication where the request for a given transaction is initiated by the publisher or central server. It is contrasted with pull/get, where the request for the transmission of information is initiated by the receiver or client.

Server—a running instance of an application (software) capable of accepting requests from the client and giving responses accordingly. Servers can run on any computer including dedicated computers, which individually are also often referred to as "the server".

Smart Device—an electronic device, generally connected to other devices or networks via different wireless protocols such as Bluetooth, NFC, Wi-Fi, LiFi, 3G, etc., that can operate to some extent interactively and autonomously.

Software Application—a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software (also called end-user programs) includes database programs, word processors, and spreadsheets. Figuratively speaking, applications software sits on top of systems software because it is unable to run without the operating system and system utilities.

Smartphone or "smart phone"—a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smartphones include all of those plus the features of a touchscreen computer, including web browsing, wideband network radio (e.g. LTE), Wi-Fi, 3rd-party apps, motion sensor and mobile payment.

URL—an abbreviation of Uniform Resource Locator (URL), it is the global address of documents and other resources on the World Wide Web (also referred to as the "Internet").

User—any person registered to use the computer system executing the method of the present invention.

Web Application or "web app" is any application software that runs in a web browser and is created in a browser-supported programming language (such as the combination of JavaScript, HTML and CSS) and relies on a web browser to render the application.

Website (also written as web site, web site, or simply site)—a collection of related web pages containing images, videos or other digital assets. A website is hosted on at least one web server, accessible via a network such as the Internet or a private local area network through an Internet address known as a Uniform Resource Locator (URL). All publicly accessible websites collectively constitute the World Wide Web.

Web Page (also written as webpage)—a document, typically written in plain text interspersed with formatting instructions of Hypertext Markup Language (HTML, XHTML). A web page may incorporate elements from other websites with suitable markup anchors.

Web pages are accessed and transported with the Hypertext Transfer Protocol (HTTP), which may optionally employ encryption (HTTP Secure, HTTPS) to provide security and privacy for the user of the web page content. The user's application, often a web browser displayed on a computer, renders the page content according to its HTML markup instructions onto a display terminal. The pages of a website can usually be accessed from a simple Uniform Resource Locator (URL) called the homepage. The URLs of the pages organize them into a hierarchy, although hyperlinking between them conveys the reader's perceived site structure and guides the reader's navigation of the site.

Wi-Fi (also spelled Wifi, WiFi, or wifi)—a local area wireless technology that allows an electronic device to exchange data or connect to the internet using 2.4 GHz UHF and 5 GHz SHF radio waves. The name is a trademark name and is a play on the audiophile term Hi-Fi. The Wi-Fi Alliance defines Wi-Fi as any "wireless local area network (WLAN) products that are based on the Institute of Electrical and Electronics Engineers' (IEEE) 802.11 standards". [1] However, since most modern WLANs are based on these standards, the term "Wi-Fi" is used in general English as a synonym for "WLAN". Only Wi-Fi products that complete Wi-Fi Alliance interoperability certification testing successfully may use the "Wi-Fi CERTIFIED" trademark.

SUMMARY OF THE INVENTION

The present invention teaches a solenoid-valve actuator, also referred to as an "end device", that is battery-powered and communicates remotely and wirelessly (e.g., via LoRaWAN) to a gateway that communicates with the internet, thereby enabling a user to remotely control fluid flow through a solenoid valve. The end device interfaces to a range of latching solenoid operated valves, e.g., for the control of water flow in irrigation systems.

The present invention is controlled via an app for a mobile device such as a smartphone or tablet that interfaces with a RESTful API backend, a network server, and one or more gateways to operate one or more deployed devices on one or more sites, e.g., campuses, shopping centers, tree farms, and nurseries. The app enables a user to schedule actuation and deactuation of a solenoid valve—either on a cyclic or weekly basis or immediately—via an end device that is connected to a solenoid valve via short (e.g., 12") wires.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

The present invention teaches an irrigation-control system that allows landscape irrigation contractors and horticulturists to control irrigation remotely and wirelessly via solenoid-valve actuators or "end devices"—which are wire-connected to and thus operate solenoid valves—via an app, the Internet, and one or more LoRaWAN gateways located centrally on a site. An end device can communicate upwards of 4,000 feet non-line-of-sight with a gateway. With one or more end devices and the accommodating app, a user can manage an irrigation system from anywhere in the world provided that there is internet access. The present invention also allows a user to remotely shut off irrigation on a site. This functionality is useful if it starts to rain or if rain is predicted in the near future on the site, as it conserves water and can lead to better plant health due to avoiding overwatering.

The present invention relates to a solenoid-valve actuator, also referred to as an "end device", that is battery-powered and communicates remotely and wirelessly (e.g., via LoRaWAN) to a gateway that communicates with the internet, thereby enabling a user to remotely control fluid flow through a solenoid valve. The end device interfaces to a range of latching solenoid operated valves, e.g., for the control of water flow in irrigation systems.

The present invention can operate, for example, using the long range LoRaWAN radio protocol that is based in the license-free ISM band of the radio spectrum. Full details on the wireless protocol and its capabilities can be found on the LoRa Alliance website, https://lora-alliance.org/.

Figure 1:
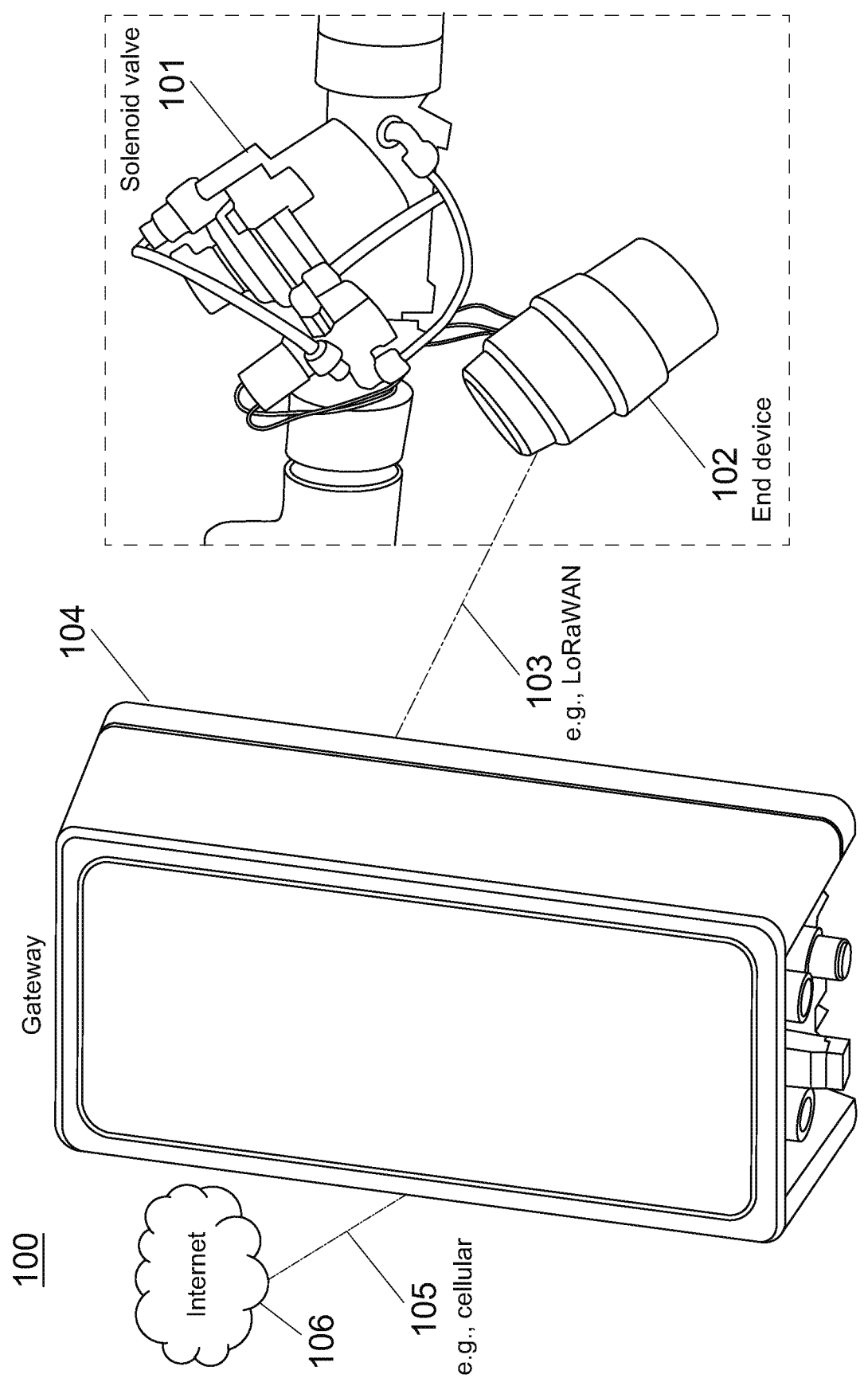
FIG. 1 illustrates the configuration and interconnectedness of the internet, a gateway, an end device, and a solenoid valve.

FIG. 1 illustrates several components enabling the remote valve control system of the present invention 100. A solenoid valve 101 is connected via wire to an end device 102 (in this case, in a 1:1 ratio). The end device 102 is wirelessly connected (e.g., via LoRaWAN 103) to a gateway 104 which communicates (e.g., via cellular 105) with the Internet.

An end device includes firmware with the capability to execute the following tasks. First, the firmware can enable an end device to automatically deactuate a wire-connected solenoid upon installation of batteries into the end device. This is useful because in shipping, a DC latching solenoid can be jostled and switch into either an open or closed position. Second, the firmware regulates the sleep and wake intervals of an end device that, in turn, determine how often an end device communicates with the Internet; exemplary settings may be: 1×/10 s for first hour after batteries installed and 1×/min thereafter. This is useful because a user is apt to test an end device within the first hour after batteries are installed. The 1×/10 s interval allows the user to get virtually live feedback; the user does not have to wait a minute to witness the execution of an actuation command. Further, the 1×/min communication (which could be configured to operate in a less-frequent interval) thereafter is useful because it conserves battery life. Third, firmware receives and executes actuation commands from the Internet. Fourth, it determines the status of an end-device including (1) battery voltage to enable a user to know when to replace batteries and (2) most recent pulse sent (i.e., actuation or deactuation) to enable a user to determine the current state of a solenoid valve. Fifth, it sends updates to the Internet regarding the status of an end device, thereby enabling a user to view status data in the app. Sixth, it commands the end device to automatically deactuate a wire-connected solenoid subsequent to the firmware identifying a low-battery voltage (e.g., 3.45 volts—a threshold specified during firmware development) within the end device. Seventh, it prevents an end device from executing any actuation commands subsequent to the firmware identifying the low-battery voltage. This is a safety feature to prevent the unnecessary waste of water in the case of an end device losing power subsequent to actuation of a solenoid valve. Finally, the firmware enables configuration of the duration (e.g., in ms) of the electrical pulse that is sent from an end device to a solenoid valve to actuate the solenoid valve. This is useful because different solenoid-valve manufacturers specify different pulse durations be used on their respective solenoids; there is no industry-standard pulse length, and there are many different manufacturers in the market.

Figure 2:
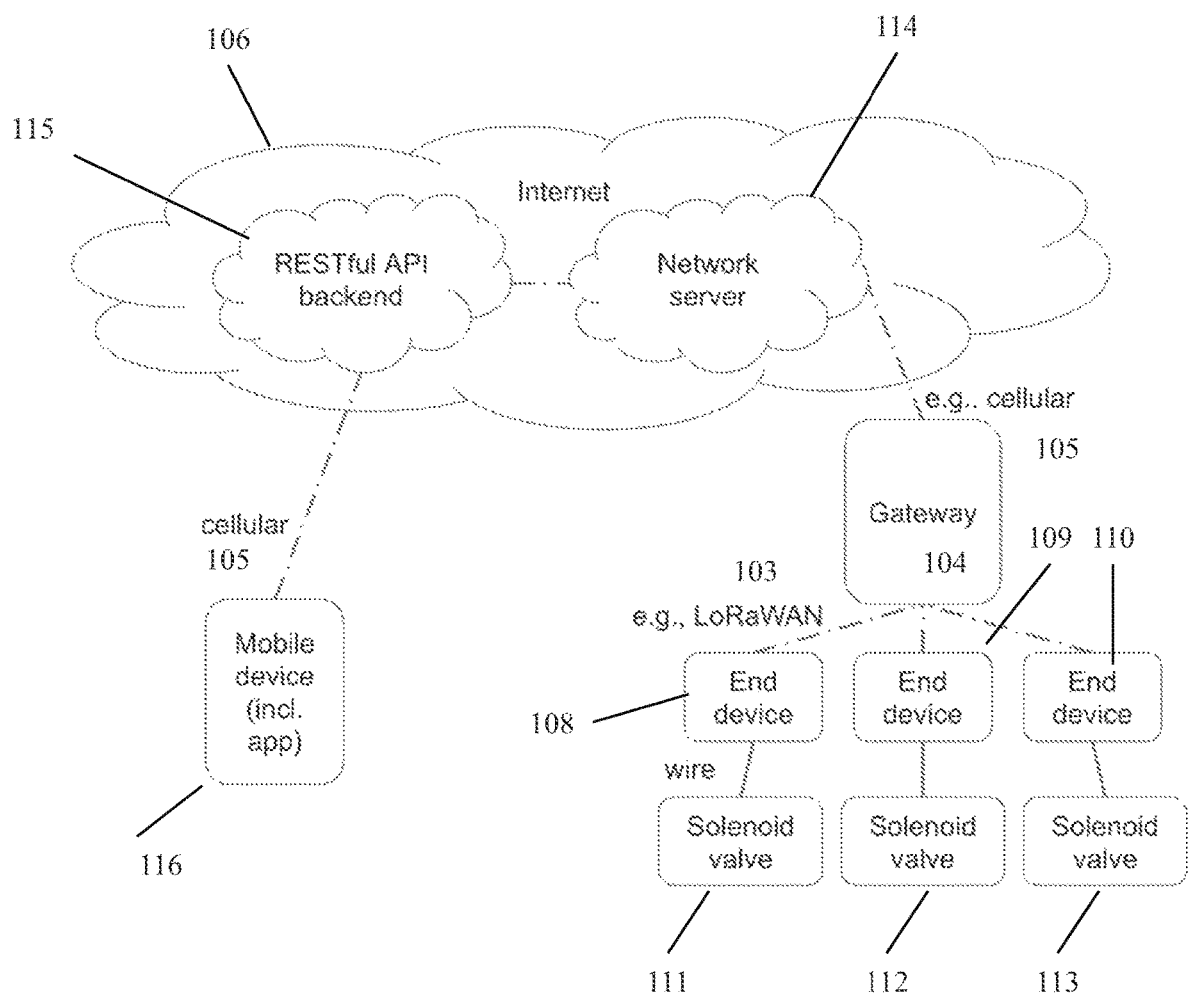
FIG. 2 is a flow chart of the present invention showing a plurality of solenoid valves, each connected to a corresponding end device taught by the present invention, where in this exemplary embodiment the end devices communicate with a gateway using LoRaWAN, and the gateway communicates via a cellular network to Network Servers and a RESTful API backend located in the Internet, and the RESTful API backend connects to mobile electronic devices such as smartphones and tables via a cellular connection.

FIG. 2 illustrates the remote valve control system 107 of the present invention. Multiple end devices 108, 109, 110, wired to individual solenoid valves 111, 112, and 113 are connected via LoRaWAN 103 to a gateway 104 which communicates with the Internet 106 via a cellular connection 105. The Internet 106 communicates with a network server 114. The network server 114 communicates with a RESTful API backed end 115 to deliver data via an application to a user of a mobile electronic device 116 such as a smartphone or tablet. The application provides the user access to information including site and valve information. The user can also send commands for specific sites and valves to the network server through the smartphone application and RESTful API backend. The network server 114 can then send commands to the end devices using the gateway 104. This completes the chain of communication between a remote user and a site with one or more valves for long-range remote control.

The present invention, once connected to a suitable network will transmit a regular update on its status in the uplink message (e.g., 1×/min). The end device of the present invention currently operates as a Class A device and is required to send before it can receive a message. These messages are processed by the back-end systems to record the current device status. If there are any pending downlink messages, then these are sent to the end device.

It is these downlink messages that include the instruction to turn on or off the solenoid valves. The messages can include a duration, in hours and minutes, to specify for how long the valve is to be in the on state. If no duration is specified, then the end device will turn off the valve after a preset or default period of time, such as 60 minutes.

The RESTful API backend abstracts the features of the network server and adds additional features to optimize user-control of one or more end devices. Certain data parameters that are essential for the operation of end devices contains are not relevant to the network server (e.g., name, location, and all scheduling). Conversely, successful operation of end devices only requires a limited number of the services provided by the network server (e.g., the ability to read and write small data packets).

The algorithm within the API backend that schedules actuations (on a weekly or cyclic basis) is robust, i.e., the likelihood of the algorithm failing is low. This is accomplished in the following manner: Periodically (e.g., every 30 seconds), an algorithm within the RESTful API backend executes a search for every end device that is programmed to actuate on a cyclic or weekly basis. Upon identifying such an end device, the algorithm then ensures that the subsequent actuation schedule exists in a future-actuation queue within the RESTful API backend. If the algorithm does find a subsequent actuation schedule, the algorithm performs no action. If the algorithm does not find a subsequent actuation schedule (e.g., due to an error, crash, etc.), then the algorithm recreates the subsequent actuation schedule from the stored schedule data within the RESTful API backend.

A user can create a new actuation schedule in the app, thereby overwriting the previous schedule; this will cause the end device to overwrite the previous schedule with the new schedule; the end device then stores and operates based on this new schedule until a different schedule is subsequently created by the user.

Figures 3A, 3B:
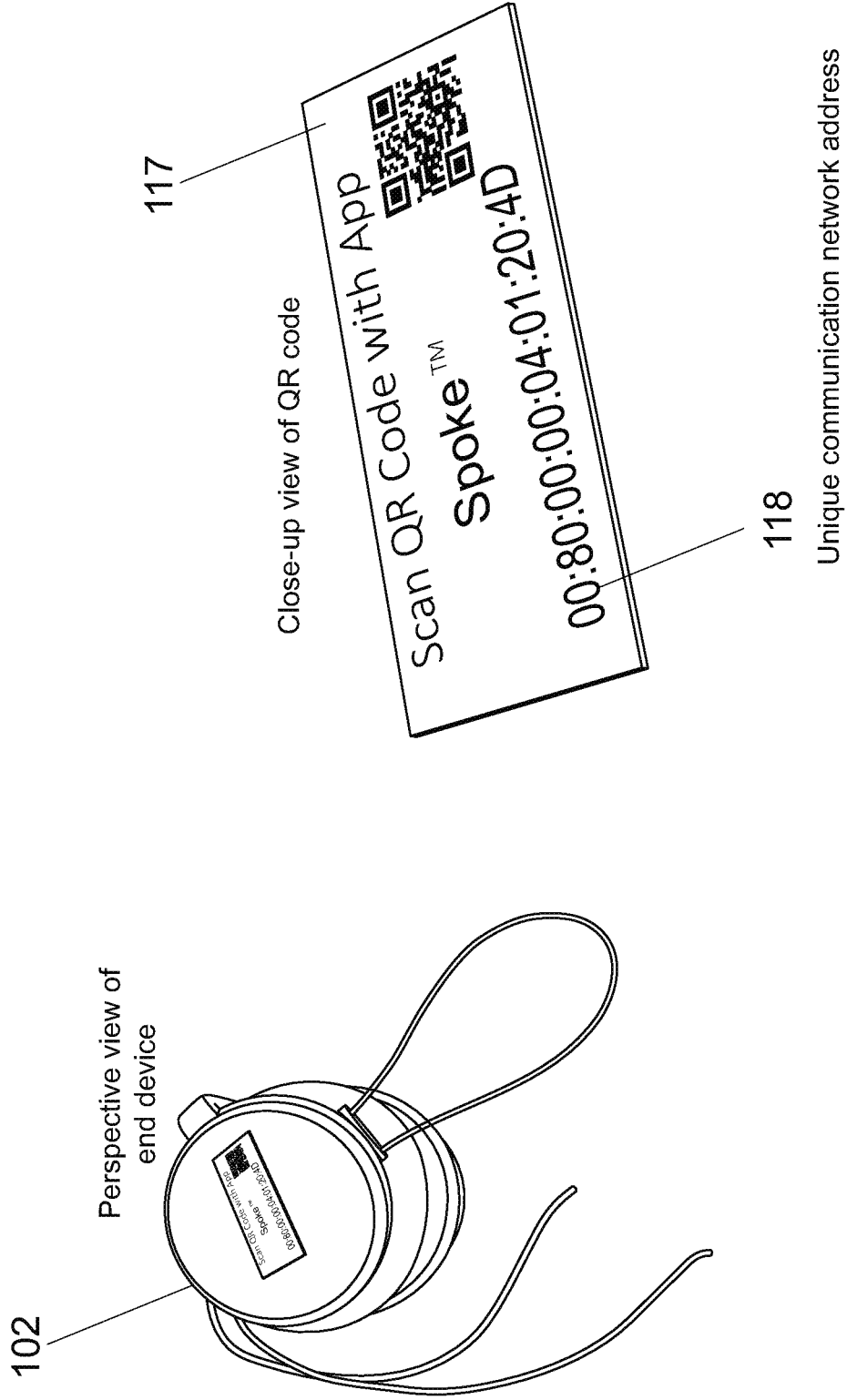
FIG. 3a illustrates a perspective view of the end device taught by the present invention.
FIG. 3b illustrates a close-up view of the QR code used to uniquely identify each end device by providing a unique communication network address.
Figure 4:
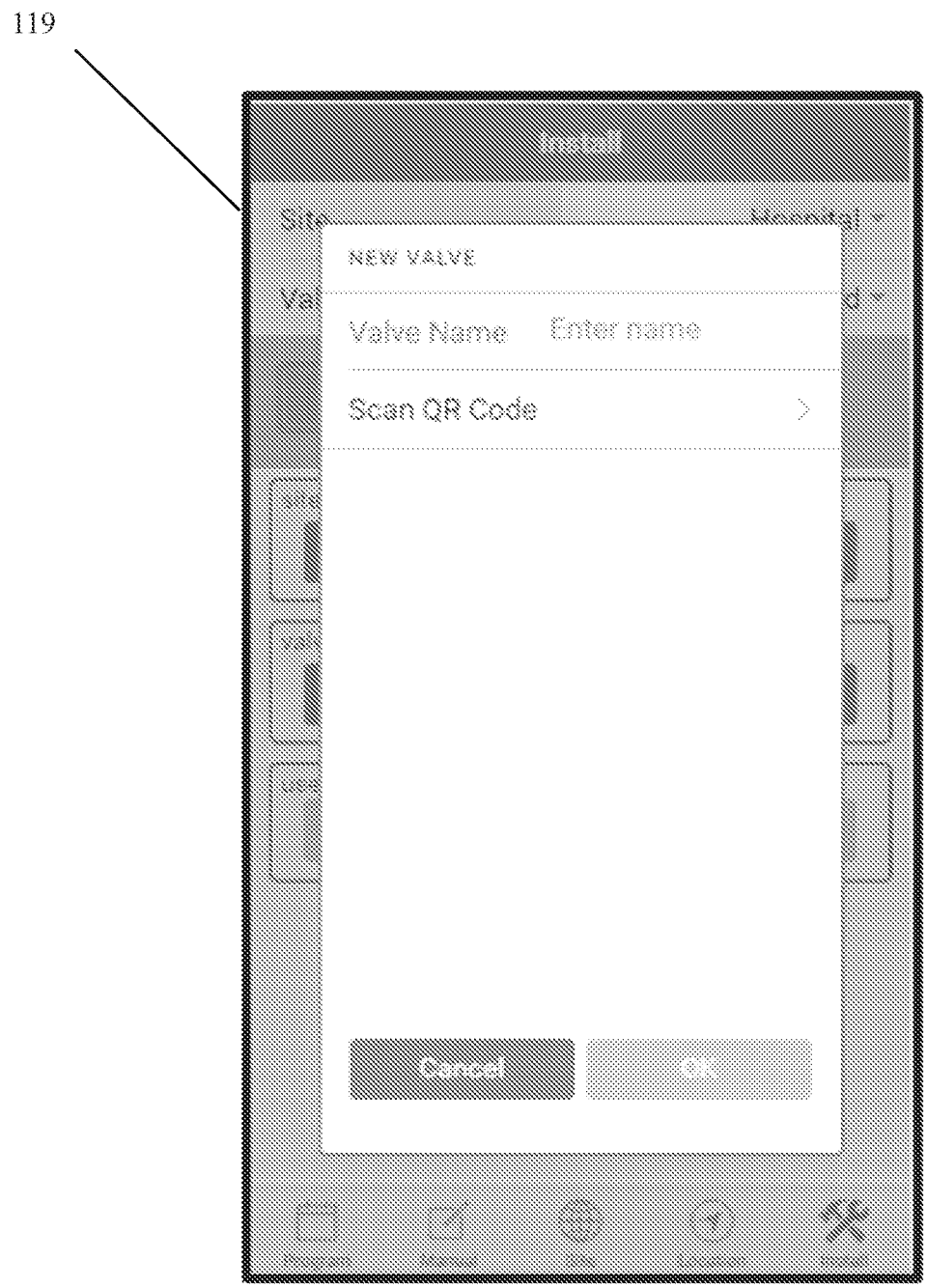
FIG. 4 is a simulated screen shot of a mobile electronic device being presented with a display directing a user to scan a QR code to establish a new end device in the system.

FIG. 3a illustrates a perspective view of the end device 102 taught by the present invention. FIG. 3b illustrates a close-up view of the QR code 117 used to uniquely identify each end device 102 by providing a unique communication network address 118. FIG. 4 is a simulated screen shot of a mobile electronic device being presented with a display directing a user to scan a QR code to establish a connection to a new end device 102 in the system 119.

Figure 5:
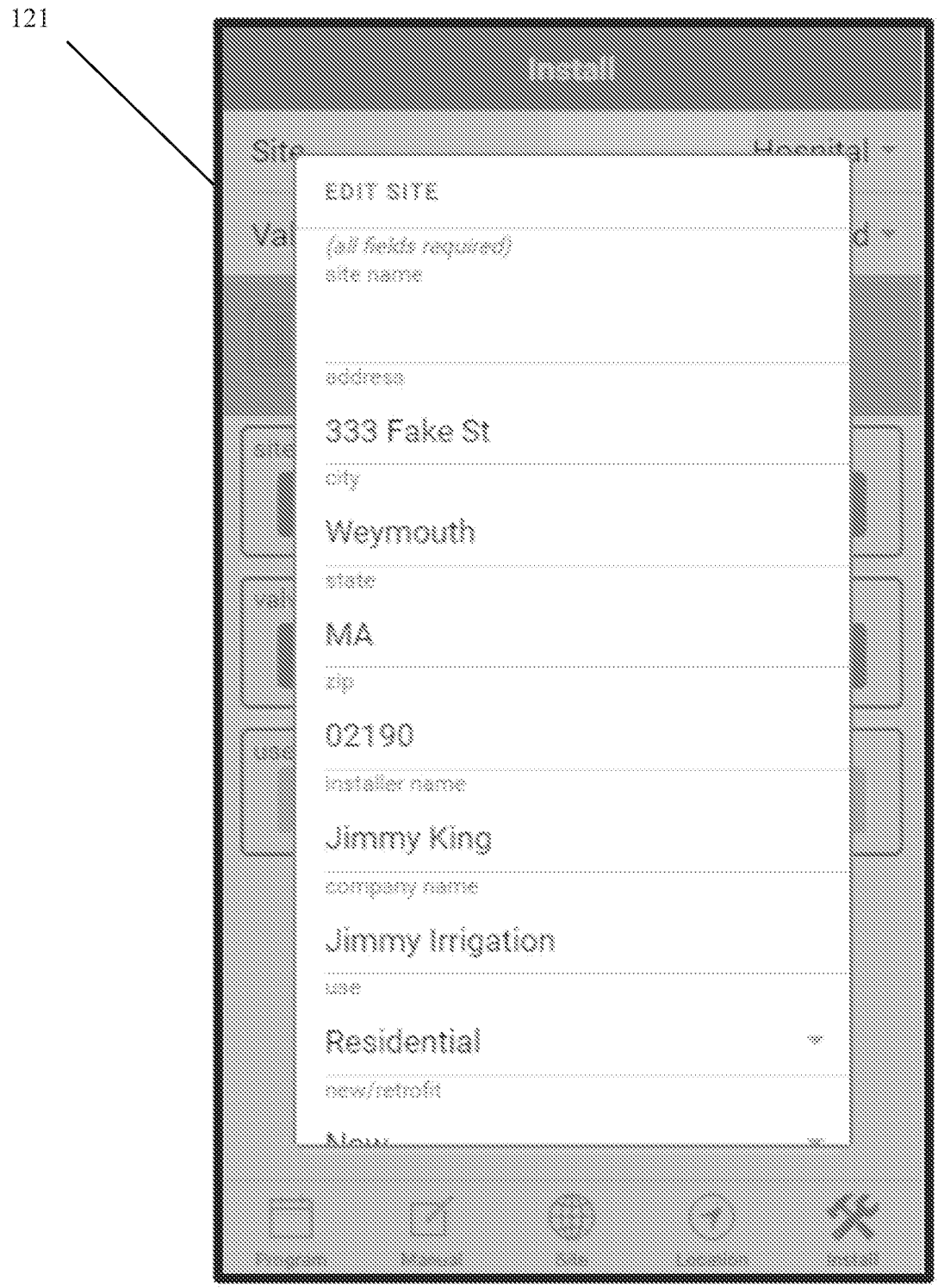
FIG. 5 is a simulated screen shot of a mobile electronic device being presented with a site edit screen for the app taught by the present invention where a user is in the process of adding, deleting, or editing a site in the system and providing identifying information for the site.

FIG. 5 is a simulated screen shot of a mobile electronic device being presented with a site edit screen for the app taught by the present invention where a user is in the process of adding, deleting, or editing a site in the system and providing identifying information for the site 120.

Figure 6:
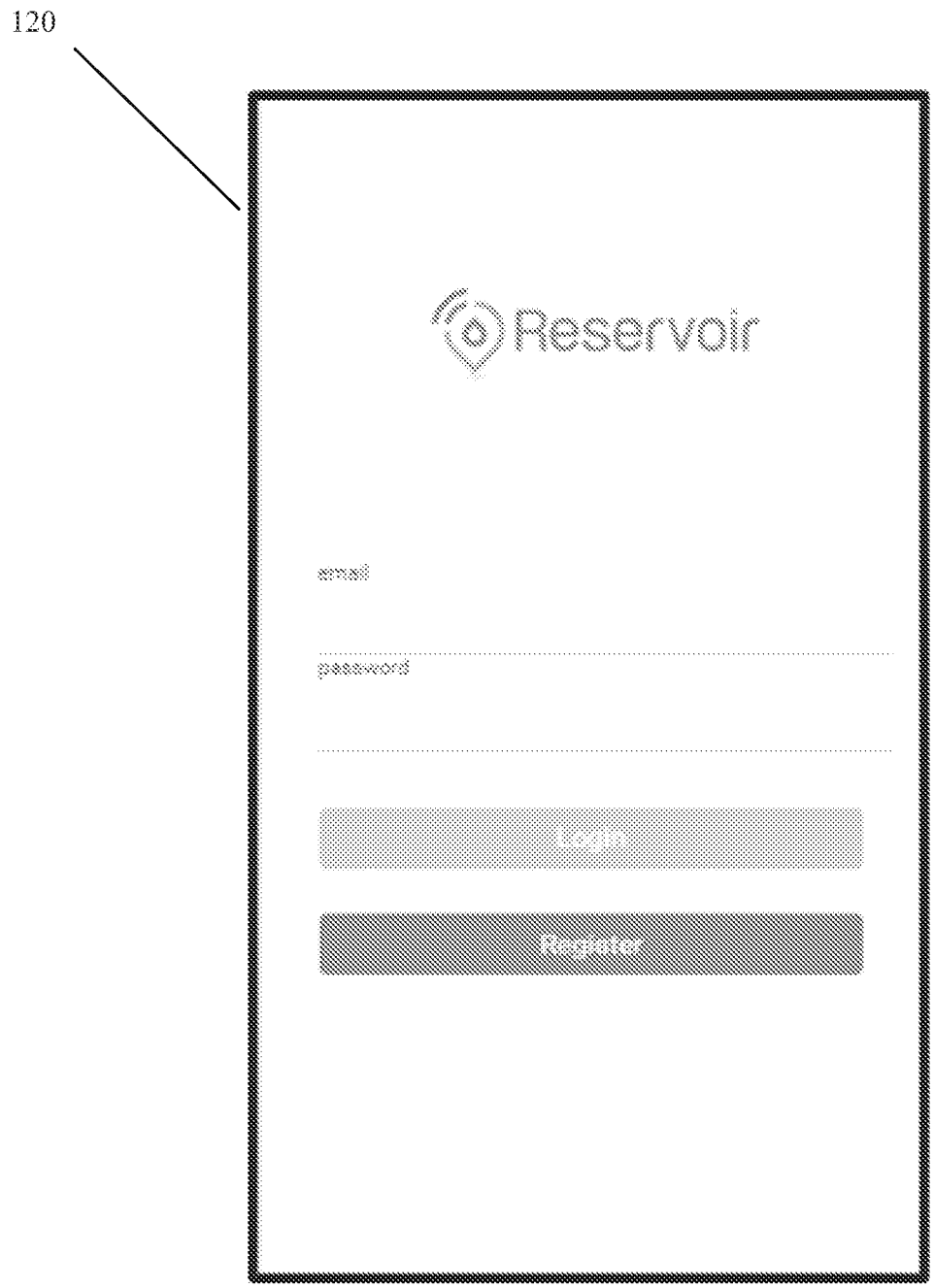
FIG. 6 is a simulated screen shot of a mobile electronic device being presented with a login/registration screen for the app taught by the present invention.

FIG. 6 is a simulated screen shot of a mobile electronic device being presented with a login/registration screen for the app taught by the present invention 121.

Figure 7:
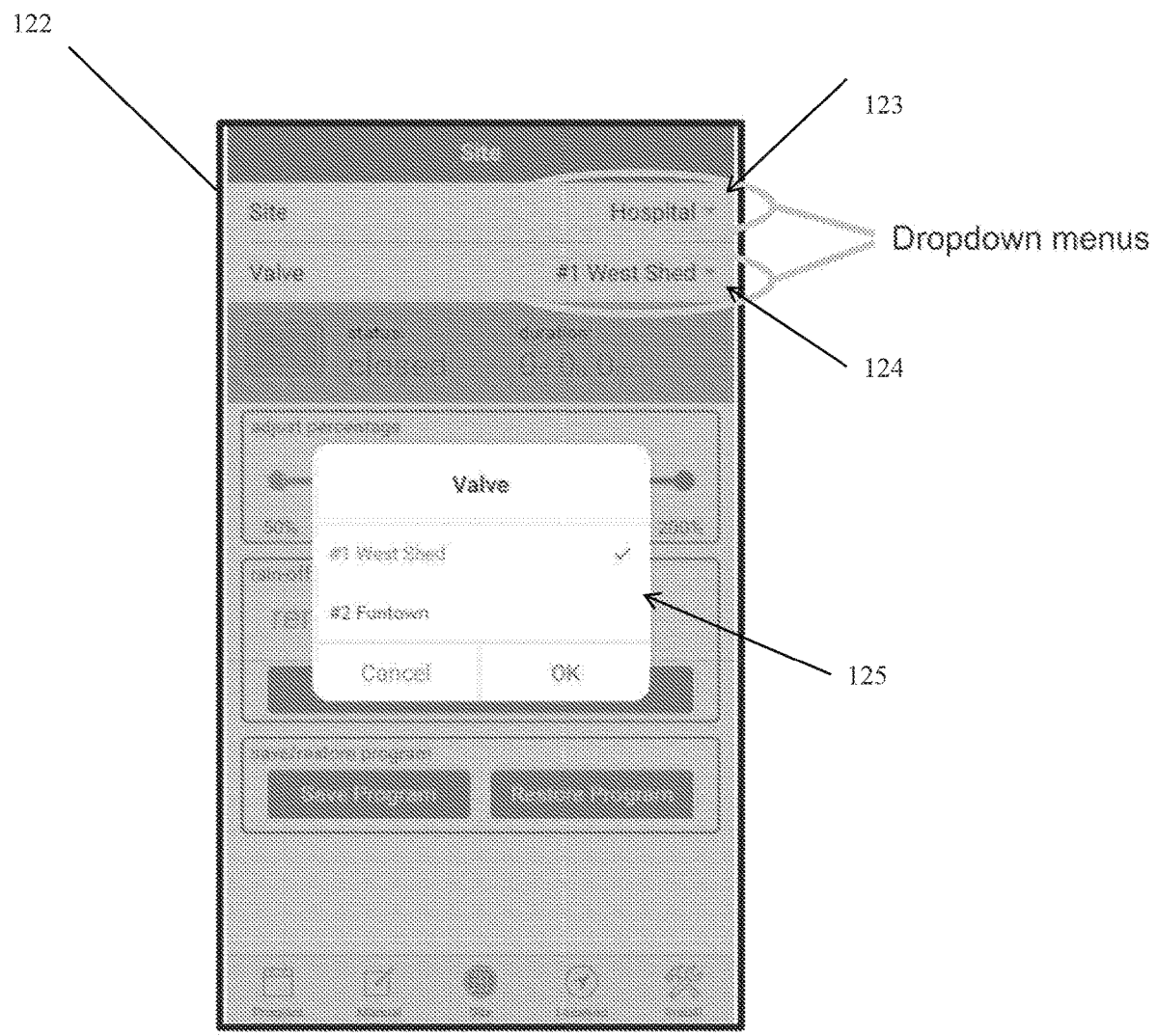
FIG. 7 is a simulated screen shot of a mobile electronic device being presented with a valve selection screen for the app taught by the present invention illustrating the drop-down menus for quickly selecting and controlling one or more valves located at a given site.

FIG. 7 is a simulated screen shot of a mobile electronic device being presented with a valve selection screen 122 for the app taught by the present invention illustrating the dropdown menus 123 and 124 for quickly selecting and controlling one or more valves located at a given site 125.

Figure 8:
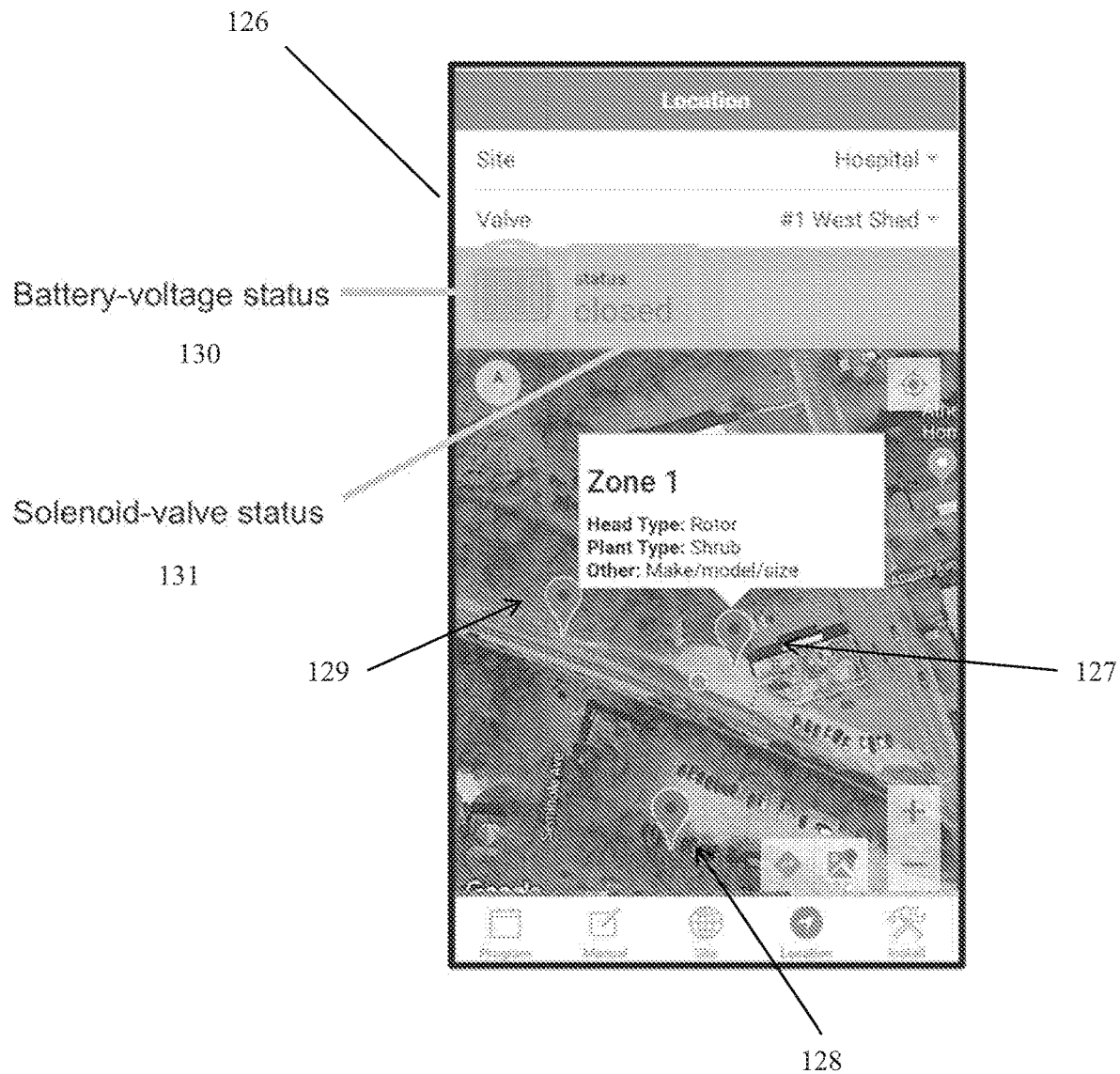
FIG. 8 is a simulated screen shot of a mobile electronic device being presented with a screen for the app taught by the present invention where GPS and mapping programs are integrated into the display to show the location of one or more valves located at a selected site, were each valve can be selected individually and a battery-voltage status and solenoid valve status such as open or closed is displayed.

FIG. 8 is a simulated screen shot of a mobile electronic device being presented with a screen 126 for the app taught by the present invention where GPS and mapping programs are integrated into the display to show the location of one or more valves 127, 128, and 129 located at a selected site, were each valve can be selected individually and a battery-voltage status 130 and solenoid valve status 131 such as open or closed is displayed.

Figure 9:
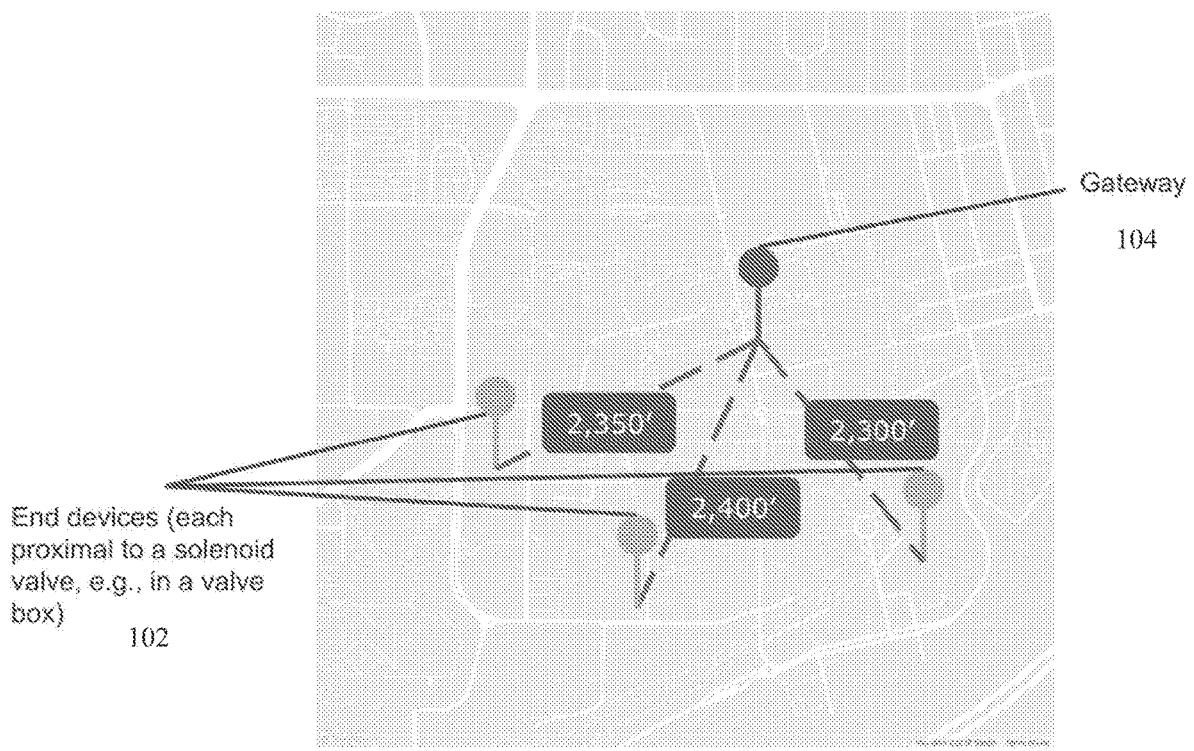
FIG. 9 illustrates a typical multi-location distribution network of the valve control network of the present invention.

FIG. 9 illustrates a typical multi-location distribution network 132 of the valve control network of the present invention. In a typical deployment of the present invention, a gateway 104 wirelessly communicates with a plurality of latching solenoid operated valves 101 via end devices 102 of the present invention. In this example, each solenoid valve 101 is paired with one end device 102; however, multiple solenoid valves 101 could be paired with a single end device 102. In the example, the gateway 104 is located approximately a half mile from each latching solenoid operated valve as they extend out in various directions from the gateway 104 to create an irrigation control system.

The system and method of the present invention is set to run on one or more computing devices, mobile electronic devices, or a combination thereof. A computing device or mobile electronic device on which the present invention can run would be comprised of a CPU, storage device, keyboard, monitor or screen, CPU main memory and a portion of main memory where the system resides and executes. Any general-purpose computer, smartphone, or other mobile electronic device with an appropriate amount of storage space is suitable for this purpose. Computer and mobile electronic devices like these are well known in the art and are not pertinent to the invention. The system can also be written in several different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. An irrigation-control apparatus comprising: a solenoid-valve actuator coupled to a solenoid valve via a wired connection, the solenoid-valve actuator is battery-powered and communicates wirelessly to a remote gateway; the remote gateway communicates with the Internet, thereby enabling a user to remotely control fluid flow through the solenoid-valve; and software included in the solenoid-valve actuator is capable of enabling the solenoid-valve actuator to automatically deactuate a wire-connected solenoid upon installation of batteries into the solenoid-valve actuator.

2. The irrigation-control apparatus of claim 1, wherein user-control of a solenoid-valve actuator is enabled by the following: a software application for a mobile device; the software application serves as a user-interface for communicating with a RESTful API (Application Programming Interface) backend the RESTful API (Application Programming Interface) backend communicates with a network server provided by a network service provider; the network service provider communicates with at least one gateway; and one or more gateways communicate wirelessly with at least one solenoid-valve actuator.

3. The irrigation-control apparatus of claim 1, wherein the solenoid-valve actuator communicates wirelessly to a remote gateway via LoRaWAN.

4. The irrigation-control apparatus of claim 1, wherein the software included in the solenoid-valve actuator is capable of regulating the sleep and wake intervals of a solenoid-valve actuator that, in turn, determine how often a solenoid-valve actuator communicates with the Internet.

5. The irrigation-control apparatus of claim 1, wherein the software included in the solenoid-valve actuator is capable of receiving and executing actuation commands from the Internet.

6. The irrigation-control apparatus of claim 1, wherein the software included in the solenoid-valve actuator is capable of determining the status of an end-device, including: the battery voltage of a solenoid-valve actuator; and the most recent pulse sent.

7. The irrigation-control apparatus of claim 1, wherein the software included in the solenoid-valve actuator is capable of sending updates to the Internet regarding the status of a solenoid-valve actuator, thereby enabling a user to view status data in an app.

8. The irrigation-control apparatus of claim 1, wherein the software included in the solenoid-valve actuator is capable of commanding the solenoid-valve actuator to automatically deactuate a wire-connected solenoid subsequent to a software identifying a low-battery voltage within the solenoid-valve actuator.

9. The irrigation-control apparatus of claim 1, wherein the software included in the solenoid-valve actuator is capable of preventing a solenoid-valve actuator from executing any actuation commands subsequent to a software identifying a low-battery voltage.

10. The irrigation-control apparatus of claim 1, wherein the software included in the solenoid-valve actuator is capable of enabling configuration of a duration of the electrical pulse that is sent from the solenoid-valve actuator to the solenoid valve to actuate the solenoid valve.

11. An irrigation-control apparatus comprising: a solenoid-valve actuator coupled to a solenoid valve via a wired connection, the solenoid-valve actuator is battery-powered and communicates wirelessly to a remote gateway; the remote gateway communicates with the Internet, thereby enabling a user to remotely control fluid flow through the solenoid-valve; the solenoid-valve actuator communicates with the Internet on a less-than-one-minute interval for a specified duration after batteries are installed into the solenoid-valve actuator; and subsequently, the solenoid-valve actuator communicates with the Internet on a one-minute-or-greater interval.

* * * * *